United States Patent
Sitaram et al.

(10) Patent No.: US 9,439,238 B1
(45) Date of Patent: Sep. 6, 2016

(54) METHOD AND SYSTEM FOR SETTING A HOLD-TIMER DURATION

(71) Applicant: Sprint Spectrum L.P., Overland Park, KS (US)

(72) Inventors: Krishna D. Sitaram, Chantilly, VA (US); Daniel Vivanco, Sterling, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 456 days.

(21) Appl. No.: 14/100,354

(22) Filed: Dec. 9, 2013

(51) Int. Cl.
*H04W 76/06* (2009.01)
*H04W 76/02* (2009.01)
*H04W 36/00* (2009.01)
*H04W 76/04* (2009.01)

(52) U.S. Cl.
CPC ....... *H04W 76/068* (2013.01); *H04W 36/0022* (2013.01); *H04W 36/0072* (2013.01); *H04W 76/028* (2013.01); *H04W 76/045* (2013.01)

(58) Field of Classification Search
CPC .......... H04W 76/045; H04W 76/068; H04W 76/028; H04M 7/0027
See application file for complete search history.

(56) References Cited

U.S. PATENT DOCUMENTS

| | | | |
|---|---|---|---|
| 8,948,746 B1 * | 2/2015 | Oroskar | H04W 48/18 455/426.1 |
| 9,049,609 B1 * | 6/2015 | Reeves | H04W 24/02 |
| 9,247,471 B2 * | 1/2016 | Velev | H04W 4/005 |
| 2009/0196167 A1 * | 8/2009 | Hu | H04W 76/046 370/216 |
| 2012/0165013 A1 * | 6/2012 | Nishida | H04W 76/068 455/435.1 |
| 2013/0329567 A1 * | 12/2013 | Mathias | H04W 36/30 370/242 |
| 2014/0177592 A1 * | 6/2014 | Li | H04W 36/0022 370/331 |
| 2015/0023184 A1 * | 1/2015 | Cili | H04W 24/08 370/252 |
| 2015/0092665 A1 * | 4/2015 | Choi | H04W 76/062 370/328 |

OTHER PUBLICATIONS

Unpublished U.S. Appl. No. 13/970,973, filed Aug. 20, 2013, with inventors Deveshkumar N. Rai et al., entitled "Method and System for Setting a Hold-Timer Duration".

* cited by examiner

*Primary Examiner* — Omer S Mian

(57) ABSTRACT

A method and system for setting a hold-timer duration is disclosed. The method involves a first network initially serving a UE by providing the UE with data service, wherein serving the UE includes allocating at least one resource to the UE and using the at least one resource to serve the UE. The method further involves, setting a hold-timer duration for a hold-timer for release of the at least one resource that the first network allocated to the UE, wherein setting the hold-timer duration comprises (i) making at least one determination selected from the group consisting of (a) a determination of a network load of the first network, (b) a determination of a data-service type of the data service, and (c) a determination of an estimated call duration for the UE and (ii) using the at least one determination as a basis to set the hold-timer duration.

19 Claims, 5 Drawing Sheets

METHOD AND SYSTEM FOR SETTING A HOLD-TIMER DURATION

BACKGROUND

Unless otherwise indicated herein, the materials described in this section are not prior art to the claims and are not admitted to be prior art by inclusion in this section.

A typical cellular wireless network includes a number of base stations that radiate to define wireless coverage areas, such as cells and cell sectors, in which wireless communication devices (WCDs) (also known as user equipment devices (UEs)), such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

In general, a cellular wireless network may operate in accordance with a particular air interface protocol or radio access technology, with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1×RTT and 1×EV-DO), Global System for Mobile Communication (GSM), WI-FI, and BLUETOOTH. Each protocol may define its own procedures for registration of UEs, initiation of communications, handoff between coverage areas, and functions related to air interface communication.

In accordance with the air interface protocol, each coverage area may operate on one or more carrier frequencies and may define a number of air interface channels for carrying information between the base station and UEs. These channels may be defined in various ways, such as through frequency division multiplexing, time division multiplexing, and/or code-division multiplexing for instance.

Furthermore, when a cellular wireless network serves a UE over an air interface, the network may allocate various network resources to facilitate communication to and from the UE. By way of example, the network may allocate a particular air interface connection, such as a dedicated air interface traffic channel or a logical radio-connection identifier or radio bearer, for use to support air interface communications between the UE and a serving base station. Further, the network may allocate a backhaul bearer connection, such as a dedicated backhaul channel or logical backhaul bearer identifier, for use to support backhaul communications for the UE. Such a backhaul bearer connection may extend between the serving base station and a switch or gateway, for instance, or between various other network components. Still further, the network may allocate storage of one or more context record (e.g., bearer context records, session context records, or the like) for the UE, which may specify UE capability information, UE service authorizations, and UE bearer status.

OVERVIEW

A method and system for setting a hold-timer duration is disclosed. An example method is operable in a communication system comprising a first network configured to serve user equipment devices (UEs) according to a first air interface protocol and a second network configured to serve UEs according to a second air interface protocol. The method involves the first network initially serving a UE by providing the UE with data service, wherein the first network serving the UE comprises the first network allocating at least one resource to the UE and using the at least one resource to serve the UE. The method also involves the first network detecting transition of the UE from being served by the first network to being served by the second network. Further, the method involves the first network setting a hold-timer duration for a hold-timer for release of the at least one resource that the first network allocated to the UE, wherein setting the hold-timer duration comprises (i) the first network making at least one determination selected from the group consisting of (a) a determination of a network load of the first network, (b) a determination of a data-service type of the data service, and (c) a determination of an estimated call duration for the UE and (ii) the first network using the at least one determination as a basis to set the hold-timer duration. Still further, the method involves after the UE transitions from being served by the first network to being served by the second network, the first network applying the hold-timer having the set hold-timer duration.

Another example method is operable in a wireless communication system comprising a first access network and a second access network. The method involves the first access network serving a UE by providing the UE with data service, wherein serving the UE comprises allocating a resource of the first access network to the UE and using the resource to serve the UE. Further, the method involves detecting a circuit-switched-fallback transition of the UE from being served by the first access network to being served by the second access network. Still further, the method involves, responsive to the detecting, (i) selecting a hold-timer duration for a hold-timer for release of the allocated resource, wherein selecting the hold-timer duration comprises (a) the first access network making at least one determination selected from the group consisting of (1) a determination of a network load of the first access network, (2) a determination of a data-service type of the data service, and (3) a determination of an estimated call duration for the UE and (b) the first access network using the at least one determination as a basis to select the hold-timer duration and (ii) starting the hold-timer having the selected hold-timer duration, wherein the first access network is configured to release the allocated resource upon expiration of the hold-timer duration.

In an example aspect, a system for setting a hold-timer duration is disclosed. The system may be a wireless communication system that includes a first access network and a second access network. The first access network may be configured to provide a plurality of first coverage areas in which to serve UEs according to a first air interface protocol. The second access network may be configured to provide a plurality of second coverage areas configured to serve UEs according to a second air interface protocol. Further, the first access network may be configured to allocate a resource to the UE and use the resource to serve the UE by providing the UE with data service. Still further, the first access network may be configured to detect transition of a UE from being served by the first access network to being served by the second access network, and, in response to detecting the transition, (i) select a hold-timer duration for a hold-timer for release of the allocated resource, wherein selecting the hold-timer duration comprises (a) the first access network making at least one determination selected from the group consisting of (1) a determination of a network load of the first access network, (2) a determination of a data-service type of the data service, and (3) a determination of an estimated call duration for the UE and (b) the first access network using the at least one determination as a basis to select the hold-timer duration and (ii) start the hold-timer having the selected hold-timer duration. Still further, the first access network may be further configured to release the allocated resource upon expiration of the hold-timer duration.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
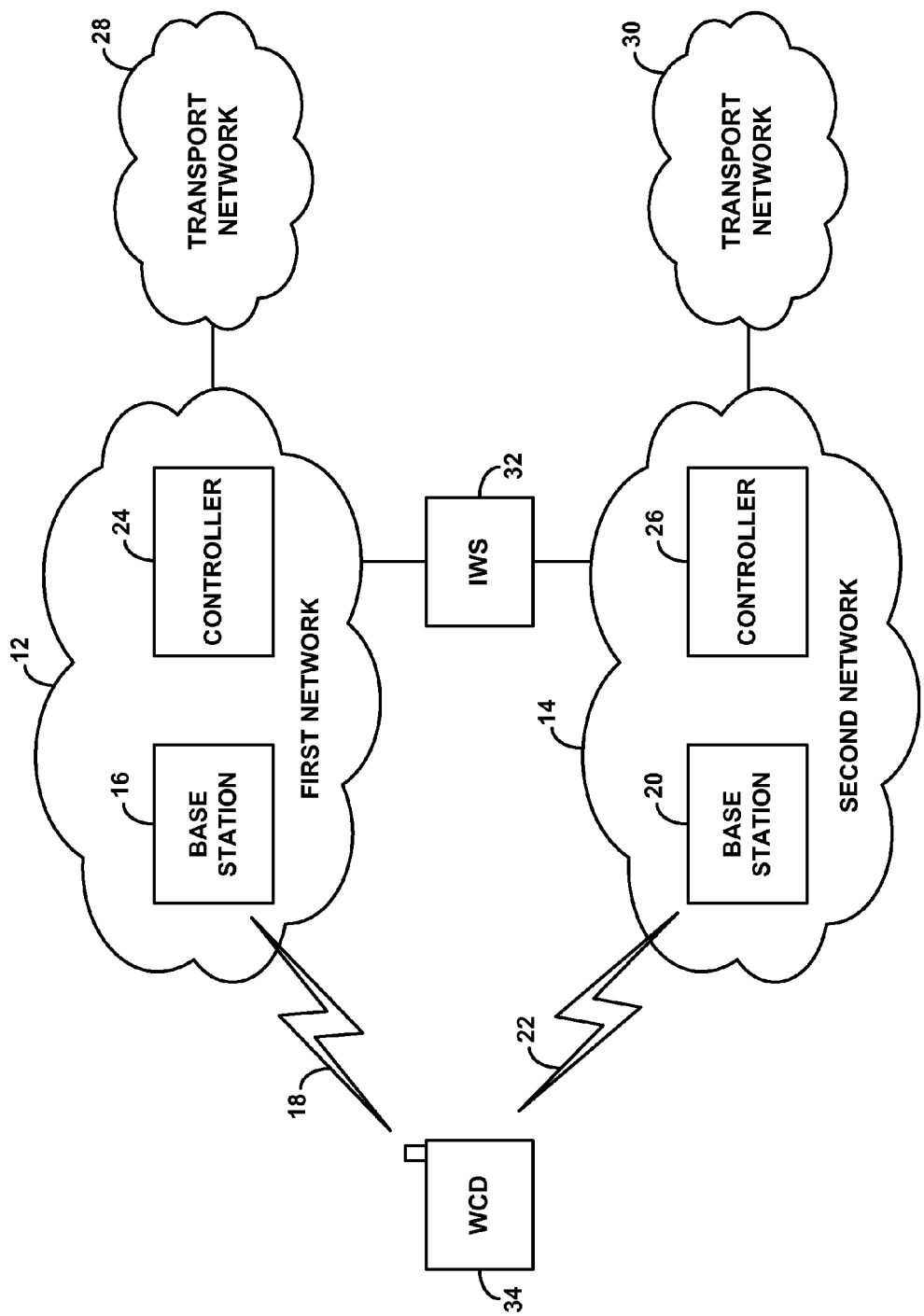
FIG. 1 is a simplified block diagram of a network arrangement in which an exemplary embodiment of the present method and apparatus can be implemented.

1. Overview of an Example Method and System

In systems that provide service under more than one air interface protocol, service providers may implement functionality that allows WCDs to operate by default on one air interface protocol and to dynamically switch over to operate on another air interface protocol when necessary to engage in certain communications. By way of example, in a system that supports both LTE service for mobile broadband and an older protocol such as CDMA or GSM for traditional voice calls, service providers may implement "circuit switched fallback" (CSFB) functionality, which allows WCDs to operate by default on LTE and to switch over to operate on CDMA or GSM to engage in voice calls. This CSFB functionality may, for example, include standard CSFB functionality and/or enhanced circuit switched fallback (eCSFB) functionality.

When CSFB functionality is implemented, for instance, a hybrid CDMA/LTE WCD may be arranged by default to scan for and register with an LTE network and to operate with its CDMA functionality off, but to then engage in control signaling with the CDMA network via the LTE network, i.e., over the LTE air interface. To facilitate this, when the WCD registers with the LTE network, LTE network infrastructure such as a mobility management entity (MME) may signal through an interworking server (IWS) with the CDMA network to register the WCD with the CDMA network as well. In an example, the hybrid CDMA/LTE WCD may be configured such that the LTE functions and CDMA functions are carried out by the same hardware platform.

In turn, when the CDMA network has a voice call to connect to the WCD, the CDMA network may signal through the IWS to the LTE network to cause the LTE network to transmit a CSFB page message to the WCD over the LTE air interface. After further CSFB signaling through the LTE network, the WCD may then use its CDMA functionality and tune to the CDMA network to engage in the call over the CDMA air interface.

In one implementation of this process, for instance, once the WCD receives the CSFB page message for the incoming CSFB call, the WCD may transmit a CSFB extended service request message to its serving LTE base station as a request to set up the incoming CSFB call. In turn, the LTE base station may then send to the WCD a list of CDMA carriers on which the local CDMA network provides service. And the WCD may use its CDMA radio to scan for coverage on each of the listed CDMA carriers and transmit to the LTE base station a report of the strongest CDMA pilot signals and corresponding signal strengths that the WCD detected. The LTE network may then pass those pilot signal measurements via the IWS to the CDMA network, and the CDMA network may use those measurements as a basis to determine a CDMA coverage area and traffic channel to assign to the WCD. The CDMA network may then transmit a handover direction message via the IWS to the LTE network, which the LTE network may transmit to the WCD, directing the WCD to transition to CDMA to communicate in the assigned CDMA coverage area and traffic channel. The WCD may then use its CDMA radio to tune to the assigned channel and to engage in the call via CDMA.

Likewise, when the WCD is served by the LTE network and has a voice call to place, the WCD may transmit over the LTE air interface to its serving LTE base station a CSFB extended service request message to request setup of an outgoing CSFB call, and the LTE base station may similarly send to the WCD a list of CDMA carriers on which the local CDMA network provides service. The WCD may then similarly tune to CDMA and scan for coverage on each of the listed CDMA carriers, and report the strongest detected CDMA pilots to the LTE base station. And the CDMA network may similarly determine a CDMA coverage area and traffic channel to assign to the WCD and transmit a handover direction message via the IWS to the LTE network for transmission to the WCD. The WCD may then similarly use its CDMA radio to tune to the assigned channel and to engage in the call via CDMA. This CSFB call setup process allows the WCD to engage in CDMA voice call setup through its existing LTE connection, without the need for the WCD to be idling in CDMA coverage in the first place.

Under LTE, when the LTE network is serving a WCD (i.e., a UE), the LTE network may allocate at least one resource to the UE and may use that at least one resource to serve the UE. For example, the LTE network may allocate a bearer to the UE and may use that bearer to serve the UE. The LTE network may also store (e.g., at the MME and/or another network entity) a context record for the UE and may use that context record to serve the UE. The context record (e.g., bearer context records, session context records, or the like) for the UE may, for instance, specify UE capability information, UE service authorizations, and UE bearer status. However, when a UE transfers to the CDMA network in a CSFB scenario, the LTE network may then release the at least one resource allocated to the UE, so as to avoid wastage of the at least one resource. The released at least one resource may then, for example, be utilized by other UEs being served by the LTE network. In another example, use of the at least one resource may be suspended until the UE returns to the LTE network (e.g., after completion of the CSFB call).

The LTE network may release the at least one resource allocated to the UE at various times. In a common example, the LTE network releases the at least one resource allocated to the UE in response to the UE transferring from the LTE network to the CDMA network to be served by the CDMA network. In another example, the LTE network may apply a hold-time and wait a set time period before releasing the at least one resource allocated to the UE by the LTE network. For instance, the LTE network may be configured to release the at least one resource a certain amount of time (e.g., 5 seconds, 10 seconds, 15 seconds, etc.) after the UE transitions from the LTE network to the CDMA network to be served by the CDMA network. Typically the value of the hold-timer duration is a static value, and the LTE network applies that static value for the hold-timer duration. The LTE network may typically apply the same value for all CSFB calls or for all CSFB calls of a given type.

In an example, the at least one resource may be a context record, and applying the hold-timer duration may involve releasing the context record after the expiration of the hold-timer duration. In another example, the at least one resource may be a bearer, and applying the hold-timer duration may involve releasing the bearer after the expiration of the hold-timer duration. Releasing the bearer may involve tearing down the bearer. In yet another example, the at least one resource may be a context record and a bearer, and applying the hold-timer duration may involve releasing the context record and the bearer after the expiration of the hold-timer duration. In still yet another example, the LTE network may release or suspend the bearer after the UE transitions to the second network for the CSFB call while preserving for the hold-timer duration the context record, and applying the hold-timer duration may involve releasing the context record after the expiration of the hold-timer duration.

A problem with using a static value for the hold-timer duration, however, is that setting the hold-timer duration at too low of a value may have disadvantages and setting the hold-timer duration at too high of a value may also have disadvantages. Regarding disadvantages of setting the hold-timer duration at too low of a value, some CSFB calls are more likely to complete call setup that other CSFB calls, and it may be useful to maintain the at least one allocated resource for a UE when call setup fails. In a situation where call setup fails, setting the hold-timer duration at too low of value may lead to disadvantages. For instance, in the event of call-setup success failure, the UE may transition back to the LTE network before setup of the CSFB call is complete. Therefore, in such a case, it would be beneficial to have maintained the at least one resource allocated to the UE, so that the LTE network could once again serve the UE using the reserved at least one resource. Reserving the at least one resource in this case may allow the UE to reconnect to the LTE network in a more efficient fashion than the UE would otherwise be able to if the at least one resource has already been released. For example, if the at least one resource had been reserved by the LTE network, the UE may reconnect to the LTE network by sending a reestablishment request (e.g., rrcReestablishmentRequest) to the LTE network. On the other hand, if the at least one resource had already been released, a reestablishment request (e.g., rrcReestablishmentRequest) may be rejected by the LTE network, and the UE would then reconnect to the LTE network using a standard connection request (e.g., rrcConnectionRequest). The connection process using a standard connection request is typically more time-consuming than the reestablishment process.

On the other hand, a problem with process of releasing the at least one resource at a set time after the transition is that the at least one resource may be reserved by the LTE network for the UE longer than necessary. Therefore, setting the hold-timer duration at too large of a value may have disadvantages. For example, should the UE complete the call setup and engage in the CSFB call, the at least one resource may still be reserved for the UE by the LTE network even while the UE is engaged in the CSFB call on the CDMA network. This may result in wastage of resources. For example, in such a case, the LTE network may assume that the UE is still active on the LTE network and thus may continue with paging and traffic flows, which eventually may result in wastage of resources because of delivery failure. As another example, the at least one resource still reserved for the UE by the LTE network could instead be used for other UEs. In such a case, it may have been beneficial to have quickly released the at least one resource allocated to the UE, so that the LTE network could avoid wastage of the at least one resource. Thus, the LTE network waiting a set time period before releasing the at least one resource may be an unproductive and inefficient use of resources.

Further, in some situations the LTE network may have fewer resources available for serving UEs operating in the LTE network than the LTE network would in other situations. For example, during peak operation times, the LTE network may have limited resources available for assigning to UEs entering the coverage of the LTE network. In such a situation, the LTE network waiting a set time period before releasing the at least one resource may be an unproductive and inefficient use of resources. For example, it may be beneficial to use these resources to serve other UEs rather than reserving the resources for the static hold-timer duration.

Another issue with using a static value for the hold-timer duration is that the call duration of CSFB calls of UEs will vary. Therefore, a given hold-timer may be more appropriate for a UE engaged in a call of a first duration than for another UE engaged in a call of a second duration. Yet another issue with using a static value for the hold-timer duration is that, in practice, an extra delay in reconnection to the LTE network may be more undesirable for a user of a given UE than for a user of another UE. For example, an extra delay in reconnection to the LTE network may be more undesirable for a user of a UE engaged in a video application prior to the CSFB call than for a user of a UE engaged in an email application prior to the CSFB call.

The disclosed method and system offers an improved way to set the hold-timer duration for releasing the at least one resource allocated to the UE in a first network in a fallback communication situation. In particular, the disclosed method and system may take into account the network load of the LTE network, the data-service type of the data service provided to the UE by the LTE network, and/or the estimated call duration for the UE. As a result, the disclosed method and system may dynamically set a hold-timer duration that is more appropriate for the UE and/or the network.

Accordingly, in one example aspect, disclosed is a method that may be implemented in a communication system that includes a first network configured to serve UEs according to a first air interface protocol and a second network configured to serve UEs according to a second air interface protocol. The method involves the first network initially serving a UE by providing the UE with data service, wherein the first network serving the UE comprises the first network allocating at least one resource to the UE and using the at least one resource to serve the UE. The method also involves the first network detecting transition of the UE from being served by the first network to being served by the second network. Further, the method involves the first network setting a hold-timer duration for a hold-timer for release of the at least one resource that the first network allocated to the UE, wherein setting the hold-timer duration comprises (i) the first network making at least one determination selected from the group consisting of (a) a determination of a network load of the first network, (b) a determination of a data-service type of the data service, and (c) a determination of an estimated call duration for the UE and (ii) the first network using the at least one determination as a basis to set the hold-timer duration. Still further, the method involves after the UE transitions from being served by the first network to being served by the second network, the first network applying the hold-timer having the set hold-timer duration.

2. Example Communication System Architecture

As noted above, FIG. 1 is a simplified block diagram of a network arrangement in which an exemplary embodiment of the present method and system can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

The arrangement of FIG. 1 includes by way of example two representative access networks 12, 14, each of which may function to provide WCDs with air interface coverage and connectivity with one or more transport networks such as the PSTN and the Internet. As such, each of these networks may include multiple base stations that radiate to provide one or more respective coverage areas defining an air interface in which to exchange control and bearer data with WCDs. For simplicity in the arrangement shown, for instance, network 12 includes a representative base station 16 that radiates to provide a coverage area 18, and network 14 includes a representative base station 20 that radiates to provide a coverage area 22. Each such coverage area may operate on one or more carriers.

Each network may then further include various network infrastructure to support setup of connections and communications and/or to provide connectivity with transport networks. This network infrastructure may take various forms and include any of a variety of network elements, including for instance a controller of one form or another. For instance, in the arrangement shown, network 12 includes a respective controller 24, and network 14 includes a respective controller 26. Network 12 is then shown providing connectivity with a representative transport network 28, and network 14 is shown providing connectivity with a representative transport network 30. In an example implementation, transport network 28 might be the Internet, and transport network 30 might be the PSTN.

As further shown in the figure, an IWS 32 is provided for passing signaling between the first network and the second network. In practice, the IWS may be provided as a function or element of one of the networks in particular. For instance, the IWS may be provided as a function of controller 26 in network 14. IWS may operate to pass signaling between the controllers 24, 26 and/or other elements of the networks. For instance, in the context of the present disclosure, the IWS may function to pass CSFB call setup messages or similar setup messages between the networks.

Network 12 and network 14, and IWS 32 may be owned and operated by a common wireless service provider, and the service provider may configure the networks to interwork with each other (or may arrange for the IWS to associate the networks with each other) so as to facilitate CSFB for instance. Alternatively, the networks may be owned and/or operated by separate wireless service providers, and those service providers may have an agreement with each other to allow for interworking between the networks, again to facilitate CSFB or the like.

With the arrangement shown in FIG. 1, a WCD 34 is shown positioned in coverage of both network 12 and network 14. When such a WCD first powers on or arrives in coverage of network 12, the WCD may scan for and detect coverage provided by network 12 and may responsively register with network 12 by transmitting in coverage area 18 to base station 16 a registration request. In response, network 12 (e.g., controller 24) may then record the fact that WCD 34 is present within coverage area 18 served by base station 16, so as to facilitate paging WCD 34 for calls or other incoming communications. Further, given the association between network 12 and network 14, network 12 may also responsively signal to IWS 32 to trigger registration of WCD 34 with network 14. WCD 34 may then idle in coverage area 18 of network 12.

When network 14 has a call or other communication to connect or otherwise provide to WCD 34, network 14 may then send a page message (or page message trigger) to IWS 32, which IWS 32 may pass along to network 12 to trigger paging of the WCD via network 12. Network 12 may then responsively page the WCD by having base station 16 transmit a CSFB page message to the WCD in coverage area 18. In line with the example CSFB procedures described above, once the WCD responds to this CSFB page, the WCD may then send a CSFB extended service request message to base station 16 to request setup of the CSFB communication. And likewise, when the WCD seeks to place a CSFB call, the WCD may establish connectivity with base station 16 and may send a CSFB extended service request message to base station 16 to request setup of that CSFB communication.

In either case, base station 16 may then transmit to the WCD a list of carriers of the second network 14 for the WCD to scan in search of coverage in which to engage in the communication. In practice, for instance, given the example association between these networks, base station 16 may be provisioned to provide as the list of carriers those on which base stations of network 14 operate. The WCD may then scan those carriers of network 14 in search of coverage and may report one or more strongest detected pilots in a measurement report to base station 16 of network 12.

Network 12 may then forward to the IWS 32 a representation of the WCD's measurement report, which IWS 32 may in turn provide to an element of network 14, such as controller 26. With that information, network 14 may then select an appropriate coverage area and traffic channel on which to have the WCD engage in the communication. And the network 14 may return to IWS 32 a handover direction message directing the WCD take transition to that coverage area and channel to engage in the communication. IWS 32 may then pass that handover direction message to network 12, and base station 16 may transmit the message in coverage area 18 to the WCD. The WCD may then transition to be served by the indicated coverage area and channel of network 14. Network 12 may set a hold-timer duration for a hold-timer for release of the at least one resource that the first network allocated to the UE. After the WCD transitions to the network 14, network 12 may apply the hold timer for the set hold-timer duration.

Figure 2:
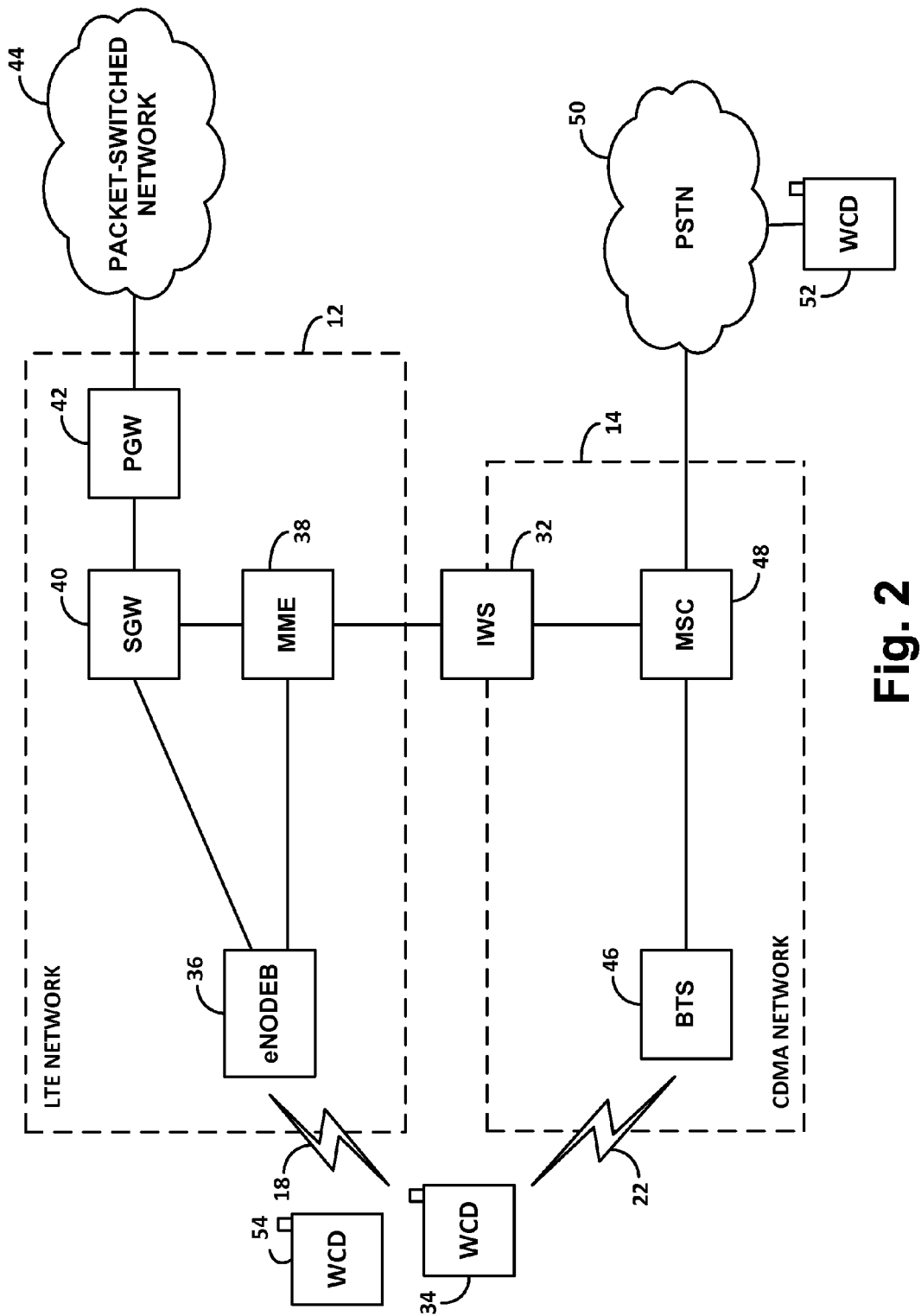
FIG. 2 is a simplified block diagram of a more specific network arrangement in which the exemplary embodiment can be implemented.

FIG. 2 is next a more specific block diagram depicting an example implementation of the network arrangement shown in FIG. 1. In the arrangement of FIG. 2, network 12 is an LTE network that primarily serves WCDs with wireless packet data communication service (including perhaps voice-over-packet and other packet-based real-time media service), and network 14 is a CDMA network that primarily serves WCDs with circuit-switched voice call service (but may also provide packet-data communication service and other types of service). These networks could take other forms as well, using other protocols such as WiMAX, GSM, or others now known or later developed.

The LTE network 12 in this arrangement is shown including a representative LTE base station 36 known as an eNodeB, which includes an antenna structure and associated equipment for engaging in LTE communication over the air interface of coverage area 18 with WCDs. The eNodeB 36 is then shown coupled with an MME 38 that serves as controller 24 and particularly as a signaling controller for the LTE network 12. Further, the eNodeB 36 is also shown coupled with a serving gateway (SGW) 40, which may then be coupled with a packet-gateway (PGW) 42 that connects with a packet-switched network 44. And the MME 38 is shown coupled with the SGW 40. Although the elements of the LTE network 12 are shown with direct connections between them, in a likely arrangement, the elements may sit as nodes on a core packet network, and thus the illustrated connections may be logical interfaces between the elements over that network.

The CDMA network 14, on the other hand, is shown including a representative CDMA base station 46 known as a base transceiver station (BTS), which includes an antenna structure and associated equipment for engaging in CDMA communication over the air interface of coverage area 22 with WCDs. The BTS 46 is then shown in communication (possibly through a base station controller (BSC) or radio network controller (RNC) (not shown)) with a mobile switching center (MSC) 48 that serves as controller 26 to manage paging over the CDMA air interface and that provides connectivity with the PSTN 50.

Further shown in FIG. 2 is then the IWS 32, which functions to facilitate interworking between the LTE network 12 and the CDMA network 14 as discussed above, so as to facilitate CSFB functionality for instance and to facilitate various specific features of the present disclosure.

In practice with this LTE/CDMA arrangement, the LTE eNodeB 36 may broadcast an overhead signal such as a System Information Block that includes data that a recipient WCD may programmatically interpret to mean that the LTE coverage area in which the overhead signal is broadcast is one that supports CSFB functionality. The WCD may then detect this broadcast signal and responsively register in coverage area 18 with the LTE network. Under LTE principles, the WCD may do so by transmitting an attach request to the eNodeB 36, including in the attach request data that indicates capabilities of the WCD and particularly an indication that the WCD supports CSFB functionality.

Upon receipt of this attach request, the LTE network may register presence of the WCD in coverage area 18 of eNodeB 36. For instance, eNodeB 36 may signal to MME 38 to trigger this registration. Further, in response to the attach request indicting that the WCD supports CSFB functionality, MME 38 may also signal to IWS 32 to trigger registration of the WCD with the CDMA network 14. In particular upon receipt of the signal from MME 38, IWS 32 may signal to MSC 48, and the MSC (e.g., in cooperation with a home location register and/or other network infrastructure) may register the fact that the WCD is currently served by the LTE network 12. The LTE network may serve the WCD by providing service such as data communication service to the WCD.

When the MSC 48 receives a request to connect a call to the WCD, the MSC may then send to the IWS 32 a page request, and the IWS may in turn signal to the MME 38. The MME may then signal to the eNodeB to trigger paging of the WCD over the LTE air interface. The eNodeB may then transmit a CSFB page to the WCD, to which the WCD may respond, and the WCD may transmit to the eNodeB a CSFB extended service request message, which the eNodeB may forward to the MME. And likewise, if the WCD seeks to originate a CSFB call, the WCD may establish connectivity with the eNodeB if necessary and may then send a CSFB extended service request message to the eNodeB, which the eNodeB may similarly forward to the MME.

In accordance with the disclosure, the LTE network 12 may have at least one resource (e.g., a context record) allocated to a UE such as WCD 34 in order to serve the UE. Further, LTE network 12 may take into account the network load of the LTE network, the data-service type of the data service provided to the UE, and the estimated call duration for the UE in order to set a hold-timer duration for release of the at least one resource that the LTE network allocated to the UE.

3. Example Network Element Components

Figure 3:
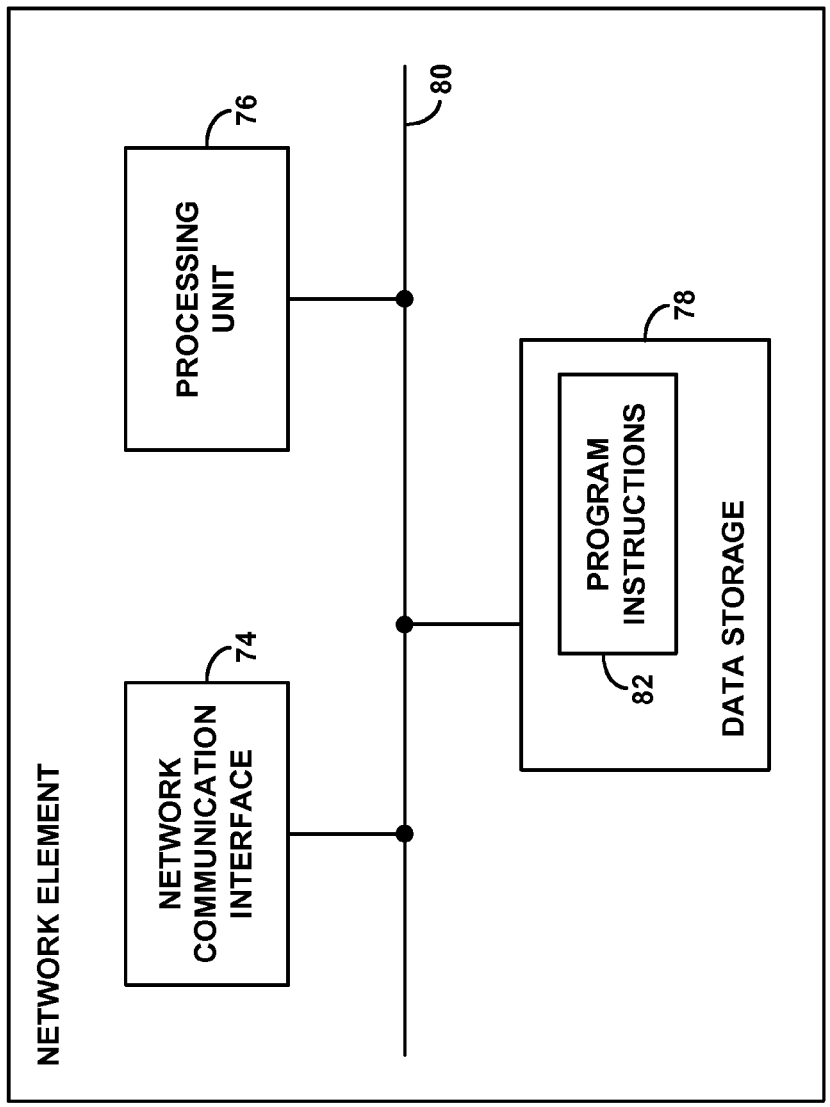
FIG. 3 is a simplified block diagram of a network element operable in a network arrangement such as that depicted in FIGS. 1 and 2.

FIG. 3 is next a simplified block diagram of a network element showing some of the physical components that such an element may include. This block diagram may represent any of a variety of the network elements shown in FIGS. 1 and 2 for instance.

As shown in FIG. 3, the network element includes a network communication interface 74, a processing unit 76, and data storage 78, all of which may be communicatively linked together by a system bus, network, or other connection mechanism 80. With this arrangement, the network communication interface may function to provide for communication with various other network elements and may thus take various forms, allowing for wired and/or wireless communication for instance. Processing unit may then comprise one or more general purpose processors (e.g., microprocessors) and/or one or more special purpose processors (e.g., application specific integrated circuits) and may be integrated in whole or in part with the network communication interface. And data storage 78 may comprise one or more volatile and/or non-volatile storage components, such as optical, magnetic, or flash memory and may be integrated in whole or in part with the processing unit. As shown, by way of example, data storage 78 may then comprise program instructions 82, which may be executable by processing unit 76 to carry out various functions described herein.

In an exemplary embodiment, data storage 78 may include program instructions that are executable to cause a first wireless network or at least one component of the first wireless network to perform functions comprising: (i) serving a UE by providing the UE with data service, wherein serving the UE comprises allocating at least one resource to the UE and using the at least one resource to serve the UE; (ii) detecting transition of the UE from being served by the first network to being served by a second network; (iii) setting a hold-timer duration for a hold-timer for release of the at least one resource that the first network allocated to the UE, wherein setting the hold-timer duration comprises (a) the first network making at least one determination selected from the group consisting of (1) a determination of a network load of the first network, (2) a determination of a data-service type of the data service, and (3) a determination of an estimated call duration for the UE and (b) the first network using the at least one determination as a basis to set the hold-timer duration; and (iv) after the UE transitions from being served by the first network to being served by the second network, applying the hold-timer having the set hold-timer duration.

4. Example Operation i. A First Example Method

Figure 4:
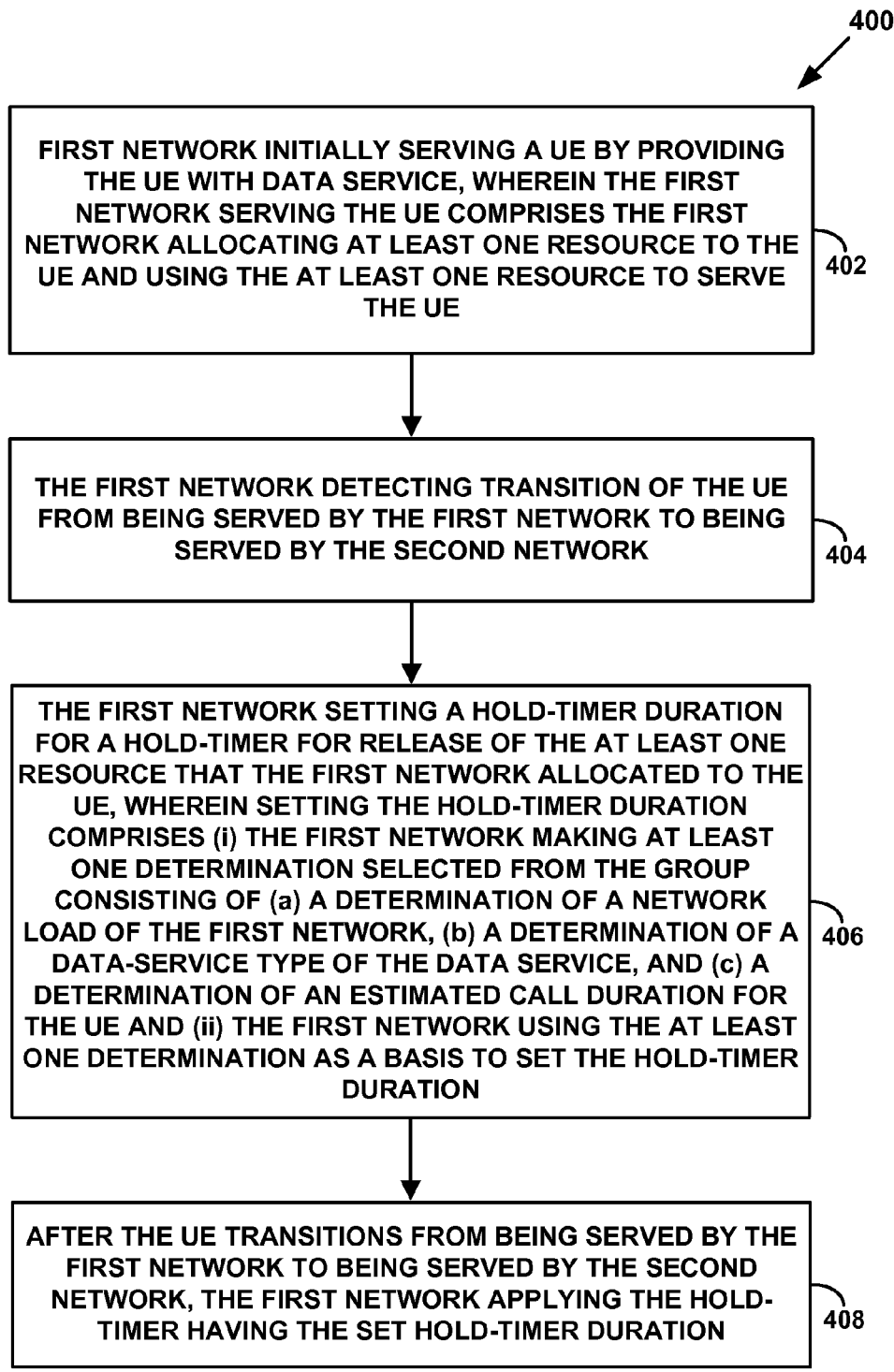
FIG. 4 is a flow chart depicting functions that can be carried out in accordance with an example method.

FIG. 4 is next a flow chart depicting a method 400 that can be carried out in accordance with the present disclosure, in an arrangement such as that depicted in FIG. 1 or more specifically in FIG. 2 for instance, and that can thus be implemented by one or more of the illustrated network elements as discussed above.

As shown in FIG. 4, at block 402, the method involves, a first network initially serving a UE by providing the UE with data service, wherein the first network serving the UE comprises the first network allocating at least one resource to the UE and using the at least one resource to serve the UE. The method also involves, at block 404, the first network detecting transition of the UE from being served by the first network to being served by the second network. Further, the method involves, at block 406, the first network setting a hold-timer duration for a hold-timer for release of the at least one resource that the first network allocated to the UE, wherein setting the hold-timer duration comprises (i) the first network making at least one determination selected from the group consisting of (a) a determination of a network load of the first network, (b) a determination of a data-service type of the data service, and (c) a determination of an estimated call duration for the UE and (ii) the first network using the at least one determination as a basis to set the hold-timer duration. Still further, the method involves, at block 408, after the UE transitions from being served by the first network to being served by the second network, the first network applying the hold-timer having the set hold-timer duration.

In an example embodiment, these functions of method 400 could be carried out by a first wireless network such as LTE network 12 illustrated in FIG. 2. Further, the second network may be a second network such as CDMA network 14, and the UE may be a WCD such as WCD 34. As mentioned above, these networks could take other forms as well, using other protocols such as WiMAX, GSM, or others now known or later developed. Still further, the method 400 may be carried out by a component or a combination of components of the first wireless network 12. For example, the method may be carried out by a first wireless network node such as eNodeB 36, or the method may be carried out by a combination of network elements such as eNodeB 36 and MME 38. Other examples are possible as well.

a. First Network Serving the UE

Returning to FIG. 4, at block 402, first network 12 serves UE 34 by providing the UE with service such as data service. Serving the UE may involve the first network allocating at least one resource to the UE and using the at least one resource to serve the UE. For example, first network 12 may allocate a context resource to the UE and may use that context resource to serve the UE. The context resource may, for example, be a context record, stored at the PGW, SGW, MME, eNodeB, or the like, for the UE. The context record may specify capability information of the UE and bearer status of the UE. In another example, the first network 12 may allocate a bearer to UE 34 and may use that bearer to serve the UE with a data connection. Other example resources for serving the UE are possible as well.

b. Detecting Transition of UE from First Network to Second Network

In the method of FIG. 4, UE 34 may transition from being served by the first network 12 to being served by the second network 14. The UE may transition from the first network 12 to the second network 14 for various reasons. In an example, the UE may transition from first network 12 to second network 14 for a fallback communication such as a CSFB call. For instance, as UE 34 is being served by first network 12, the UE may either receive a call from a call destination such as WCD 52 or place a call to a call destination such as WCD 52. First network 12 may then signal to invoke set up of a CSFB call between the UE and the call destination via second network 14.

At block 404, the first network 12 may detect this transition of the UE from being served by the first network to being served by the second network 14. Detecting the transition may involve detecting that the transition of the UE from being served by the first network 12 to being served by the second network 14 is about to occur, is occurring, or has just occurred. For instance, the act of detecting transition of the UE from being served by the first network to being served by the second network could be done by the MME receiving a signal (e.g., from an eNodeB serving the UE) that indicates the UE is moving or has moved to the fallback network to engage in a CSFB call, or that indicates or is associated with setup of such a CSFB transition, whether the transition is about to occur, is occurring, or has just occurred for instance.

c. Setting Hold-Timer Duration

At block 406, the first network 12 sets a hold-timer duration for a hold-timer for release of the at least one resource that the first network allocated to the UE. In an example, the first network 12 may set the hold-timer duration in response to detecting the transition of the UE from being served by the first network 12 to being served by the second network 14. Setting the hold-timer duration involves the first network 12 making at least one determination selected from the group consisting of (a) a determination of a network load of the first network, (b) a determination of a data-service type of the data service, and (c) a determination of an estimated call duration for the UE. The first network 12 then uses the at least one determination as a basis to set the hold-timer duration.

In an example, first network 12 may make the at least one determination before the UE transitions from being served by the first network to being served by the second network. For instance, the first network 12 may make the at least one determination during the CSFB-signaling process. In another example, however, the first network may make the at least one determination after the UE completes transitions from being served by the first network to being served by the second network.

1. Determination of Network Load

First network 12 may make a determination of a network load of the first network in various ways. The first network may have a maximum capacity and the first network may determine that the first network is operating at a given percentage of the maximum capacity (e.g., 50%, 60%, 70%, 80%, etc.). For instance, eNodeB 36 serving UE 34 may have a maximum capacity, and the eNodeB (or MME 38 and/or another network entity) may determine the load of the eNodeB. For instance, the eNodeB may have a maximum number of UEs that the eNodeB may serve at a given time. The first network 12 may determine the number of UEs that the eNodeB 36 is currently serving, and then the first network may determine the load of the eNodeB by determining a percentage of the total capacity.

The first network may determine that the first network is operating at a given percentage of the maximum capacity in various ways. In an example, the first network 12 may have a maximum number of Radio Resource Control (RRC) connections available to UEs. For instance, in a particular example, the eNodeB 36 may have a maximum of 500 RRC connections. The first network 12 may determine that there are 450 active RRC connections, and therefore the first network may determine that the eNodeB has a 90% load.

In another example, the first network 12 may have a maximum number of UEs that may idle in the first network. For instance, in a particular example, MME 38 may have a limit of 1,000 idle UEs for a given eNodeB such as eNodeB 36. The first network 12 may determine that there are 800 idle UEs for eNodeB 36, and therefore the first network may determine that the eNodeB has an 80% load. In yet another example, the first network 12 may determine the network load based on RF-utilization of the first network. As still yet another example, the first network 12 may have a maximum number of context records available for UEs operating in the first network. For instance, MME 38 and/or eNodeB 36 may have a maximum number of context records available for UEs. In a particular example, eNodeB 36 may have a maximum number of 500 context records available for UEs, and the first network 12 may determine that there are 450 context records stored at the eNodeB. Therefore, in this particular example, the first network 12 may determine that the eNodeB 36 has a 90% load. Other example ways of determining network load are possible as well.

2. Determination of Estimated Call Duration

The first network 12 may make a determination of an estimated call duration for the UE in various ways. Generally, the estimated call duration may be estimated based on call-duration history of the UE 34 or call-duration history for calls (e.g., CSFB calls) on the second network 14. By making the determination of an estimated call duration for the UE 34, the first network 12 may estimate the amount of time that the UE will spend on the second network 14 before attempting to return to be served by the first network. Typically, this amount of time that the UE will spend on the second network 14 before attempting to return to be served by the first network will amount to or be associated with the amount of time that the UE 34 will be engaged in the CSFB call on the second network 14.

In an example, the first network 12 may store or may have access to call-duration history data for the UE 34. For instance, the UE 34 may maintain call-history data for the UE, and the UE may be configured to send to the first network 12 the call-duration history and/or an estimated call duration for the CSFB call of the UE. In another example implementation, the second network 14 (e.g., PSTN 50) may maintain call-duration history for the UE, and the second network may be configured to send to the first network the call-duration history and/or an estimated call duration for the CSFB call of the UE. Beneficially, by selecting the estimated call duration based on call-duration history of the UE 34, the accuracy of the estimated call duration for that UE may be improved.

As mentioned above, the estimated call duration may also be based on call-duration history for calls (e.g., CSFB calls) on the second network 14. In an example, the first network 12 may store or may have access to call-duration history for calls on the second network 14. For instance, the first network 12 and/or the second network 14 may store pre-calculated tables that include offered voice traffic volume (e.g., erlangs) for the second network. Typically, offered traffic (in erlangs) is related to the call arrival rate ($\lambda$) and the average call-holding time (h) by E=$\lambda$h, provided that h and $\lambda$ are expressed using the same units of time (e.g., seconds and calls per second, or minutes and calls per minute).

The first network 12 may refer to this stored information to estimate the average call duration of calls in an area under coverage of the second network 14 that corresponds to the coverage area of the first network 14 (e.g., the coverage area of the eNodeB 36). This offered voice traffic volume for the specific network may vary for different times of the day, and the first network 12 may take those different times of the day into account when making the determination of estimated call duration. Beneficially, by selecting the estimated call duration based on call-duration history for calls on the second network 14, the estimated call duration may be specific to the second network 14 to which the UE 34 is transitioning. This specificity to the second network 14 may improve the accuracy of the estimated call duration for the UE 34. For instance, networks located in different locations may have different call-duration histories. For example, a call-duration history for calls in a network in City X may be different than the call-duration history for calls in a network in City Y.

In an example implementation, the estimated call duration is estimated based on the call duration of CSFB calls for which a UE has transitioned from the first network 12 to the second network 14. For instance, a plurality of UEs may have transitioned from being served by the eNodeB to being served by the second network for CSFB calls. Making a determination of an estimated call duration for the UE may involve making the determination based on call-duration history of the CSFB calls of the plurality of UEs. It should be understood, however, that the first network 12 could make a determination of an estimated call duration in other ways as well.

3. Determination of Data-Service Type

First network 12 may make a determination of the type of service provided to the UE 34 and may use the determination of type of service as a basis to set the hold-timer duration. For example, as mentioned above, the first network 12 may make a determination of a data-service-type of the data service provided to the UE. The first network 12 may determine the data-service type in various ways. In an example, the first network 12 may determine the data-service type based on information obtained from or provided by an LTE data-packet inspector (DPI).

Example data-service types include, without limitation, email, real-time gaming, and video. In another example, data service may be associated with a Quality of Service (QoS) Class Identifier (QCI) value (e.g., QCI values between 1 and 9), and the data-service type may be the associated QCI value. Therefore, determining the data-service type may include determining the QCI value of the data service. Other examples are possible as well.

4. Using the at Least One Determination as Basis to Set Hold-Timer Duration

After making the at least one determination, the first network 12 may use the at least one determination as a basis to set the hold-timer duration. Generally, the first network 12 may use each of the at least one determinations as a factor in setting the hold-timer duration. In an example, the first network 12 may (i) select a first value based on the determination of the network load of the first network, (ii) select a second value based on the determination of the data-service type of the data service, and (iii) select a third value based on the determination of the estimated call duration for the UE. The first network 12 may then set the sum of the first value, the second value, and the third value as the hold-timer duration. In example embodiments, the values may be positive or negative values. For instance, the first value based on the determination of the network load of the first network may be less than or equal to zero.

In an example embodiment, the first network may apply the following algorithm to set the hold-duration value:

$$T_F = T_0 + F_1 - F_2$$

where $T_F$ is the set hold-timer duration, $T_0$ is the duration value based on the estimated call duration for the UE, $F_1$ is the duration value based on the determination of the data-service type of the data service, and $F_2$ is the duration value based on the determination of the network load of the first network.

First network 12 may maintain or have access to correlation data that correlates network loads with respective duration values. For instance, the data may correlate (i) network loads falling within a first range with a given hold-timer duration value, (ii) network loads falling within a second range with another given hold-timer duration value, (iii) network loads falling within a third range with a yet another hold-timer duration value, and so forth. This data may include data related to a plurality of wireless networks or this data may be specific to the given coverage area for which the method 400 is applied. Further, selecting a duration value based on the determination of the network load of the first network may involve referring to the correlation data to select the first duration value based on the determination of the network load.

In practice, the absolute value of the selected duration value based on the determination of the network load may increase proportional to the network load. Thus, the network may decrease the hold-timer duration based on the determination of network load. As a particular example, the selected duration value based on the determination of the network load may be negative 30 seconds for a network load of 90% while the selected duration value based on the determination of the network load may be negative 15 seconds for a network load of 70%. By increasing the absolute value of the selected duration proportional to loading, applying the duration value based on the determination of the network load may beneficially reduce the network overhead and free up resources more quickly in situations where the network load is high.

Further, first network 12 may maintain or have access to correlation data that correlates data-service types with respective duration values. For instance, the data may correlate (i) a first data-service type with a given hold-timer duration value, (ii) a second data-service type with another given hold-timer duration value, (iii) a third data-service type with a yet another hold-timer duration value, and so forth. Further, selecting a duration value based on the determination of the data-service type of the data service may involve referring to the correlation data to select the second duration value based on the determination of the data-service type of the data service.

The selected duration value based on the determination of the data-service type may be lower for less-intensive data-service types and higher for more-intensive data-service types. For example, the selected duration value for the data-service type of email may be lower than the selected duration value for the data-service type of video. In practice, an extra delay in reconnection to the LTE network 12 may be more undesirable in a situation where a UE is engaged in a video application than in a situation where a UE is engaged in an email application. In another example, the selected duration value based on the determination of the data-service type may be lower for higher QCI values and higher for lower QCI values. For example, the selected duration value based on the determination of the data-service type may be lower for a QCI value of 9 than for a QCI of 1. Other examples are possible as well.

Still further, selecting a duration value based on the determination of the estimated call duration for the UE may involve setting the estimated call duration as the third duration value. In another example, the duration value based on the determination of the estimated call duration may be set to be a duration value corresponding to the estimated call duration, such as a duration of a given percentage of the estimated call duration value (e.g., 80%, 90%, 110%, etc.).

In an example embodiment, the selected duration values based one of these determinations (e.g., the network load, estimated call duration, or data-service type) may vary depending on that particular determination and/or the other determinations. For instance, the first network 12 may weigh both the data-service type and estimated call duration more heavily in a situation where the network load is low (e.g., 50% or below) than in a situation where the network load is higher (e.g., 80% or above). In a situation where the network load is lower, it may be possible to select a longer hold-timer duration. In another example, if the network load exceeds a threshold, the first network sets the hold-timer duration to zero regardless of the estimated call duration or data-service type. First network 12 may select any appropriate threshold for determining when to set the hold-timer duration to zero. In a particular example, the threshold may be a 90% or higher network load. In yet another example, if the estimated call duration exceeds a threshold (e.g., 20 minutes or more), the first network sets the hold-timer duration to zero regardless of the data-service type or network load. It should be understood that the above-detailed examples of weighing the various factors are merely examples and are not meant to be limiting.

d. Applying Hold-Timer Having Set Hold-Timer Duration

Returning to FIG. 4, at block 408, after UE 34 transitions from being served by first network 12 to being served by second network 14, the first network applies the hold-timer having the set hold-timer duration for release of the at least one resource that the first network allocated to the UE. In an example, first network 12 may begin applying this hold timer after UE 34 completes the transition from being served by first network 12 to being served by second network 14. In another example, first network 12 may begin applying this hold timer before UE 34 transitions from being served by first network 12 to being served by second network 14 and may continue to apply the hold-timer after the UE transitions from being served by the first network to being served by the second network. For instance, first network 12 may begin applying the hold-timer after signaling begins to invoke setup of the CSFB call via the second network 14 but before the UE 34 completes the transition from being served by the first network to being served by the second network. For example, first network 12 may begin applying the hold timer after setting the hold-timer duration, which may occur before the UE actually completes transition of the UE from being served by the first network to being served by the second network. Other examples triggers for beginning applying the hold timer are possible as well.

The first network 12 may maintain for the hold-timer duration the at least one resource allocated to the UE 34. This process may help to reserve the at least one resource for the UE should the UE return to the first network 12 before expiration of the hold-timer duration. For example, the UE may return to the first network 12 in a situation where call setup fails or where the duration of the call is less than the set hold-timer duration. Call setup may fail for various reasons, such as poor RF quality or the user rejecting the CSFB call. If the UE 34 transitions back to the first network 12 before expiration of the hold-timer duration, first network 12 may again use the allocated at least one resource to serve UE 34. In accordance with examples of the disclosed method, the selected hold-timer duration may be longer in situations where the call has a longer estimated duration, the network has a lower network load, and/or the data-service type is a more intensive data service-type.

On the other hand, if the UE fails to return to the first network 12 before expiration of the hold-timer, the first network 12 may release the at least one resource allocated to the UE at the expiration of the hold-timer duration. In particular, the first network 12 may wait the hold-timer duration and may then, in response to expiration of the hold-timer duration, release the at least one resource. As mentioned above, releasing the at least one resource in response to expiration of the hold-timer duration may involve releasing the bearer and/or deleting the context record of the UE. Further, as mentioned above, the first network 12 may have released or suspended the bearer when the UE transitioned to the second network 12 while preserving the context record for the hold-timer duration. In such an example, releasing the at least one resource in response to expiration of the hold-timer duration may involve deleting the context record for the UE 34.

After releasing the at least one resource allocated to the UE 34, the first network 12 may then use that at least one resource to serve one or more UEs as needed. The first network 12 may use the at least one resource to serve one or more other UEs operating under the coverage of the first network 12, such as WCD 54. In an example, the first network 12 may have a limited number of bearers available for use in serving UEs, as well as a limited number of context records that may be stored. By releasing a bearer, the network may use that bearer to serve another UE. Further, by deleting a context record, the first network may be able to use that context resource for storing a context record for another UE.

The act of applying the hold-timer having a hold-timer duration for release of the at least one resource may take various forms. For instance, eNodeB 36 may set and apply the hold timer. Further, in response to expiration of the hold-timer duration, the eNodeB 36 may send a message to MME 38 instructing the MME to release the at least one resource. In another example, the MME 38 may then set and apply the hold timer. Other examples are possible as well.

ii. A Second Example Method

Figure 5:
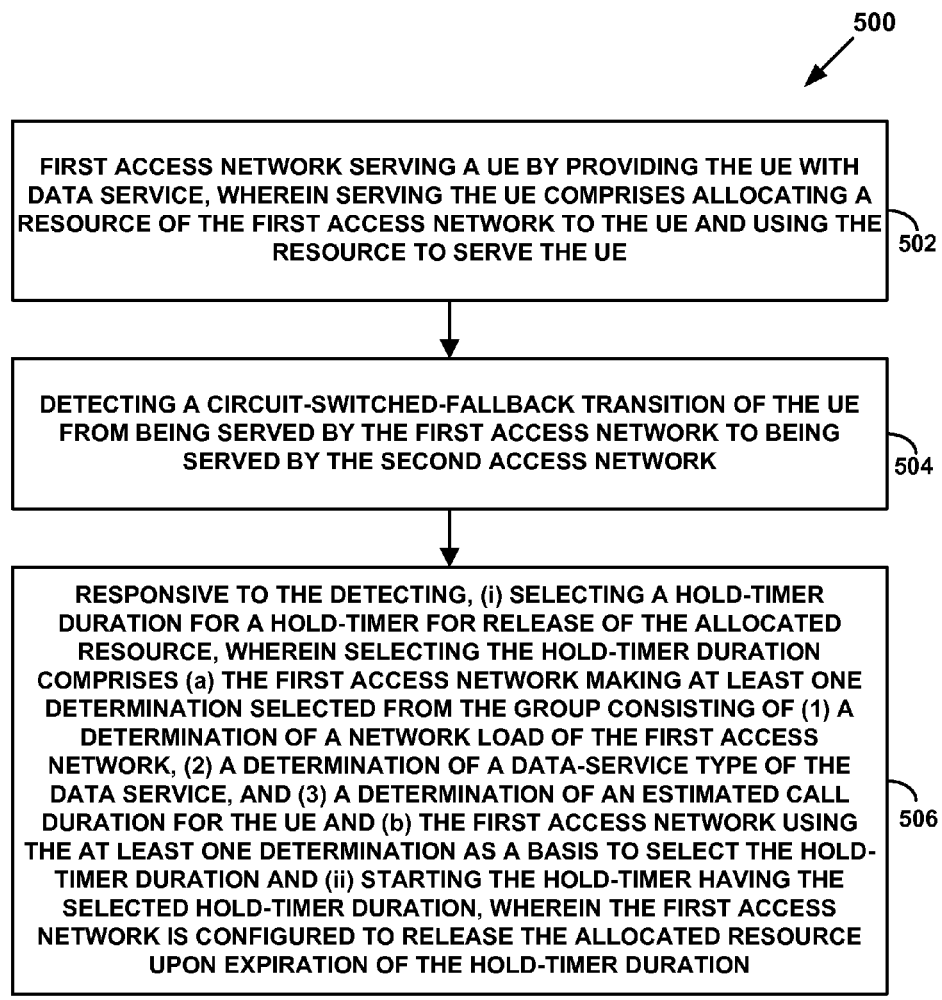
FIG. 5 is another flow chart depicting functions that can be carried out in accordance with an example method.

FIG. 5 is next another flow chart depicting a method 500 that can be carried out with a network arrangement including a first access network and a second access network, such as the network arrangement shown in FIG. 1 or FIG. 2 for instance. For example, method 500 may be carried out by LTE network 12. Furthermore, method 500 is similar in some respects to the method 400, and thus is not described in as great of detail. It should be explicitly noted, however, that any possibilities and permutations described above with respect to method 400 may equally apply to method 500, and vice versa.

As shown in FIG. 5, method 500 involves, at block 502, a first access network serving a UE by providing the UE with data service, wherein serving the UE comprises allocating a resource of the first access network to the UE and using the resource to serve the UE. The method then involves, at block 504, detecting a circuit-switched-fallback transition of the UE from being served by the first access network to being served by the second access network. Further, the method involves, at block 506, responsive to the detecting, (i) selecting a hold-timer duration for a hold-timer for release of the allocated resource, wherein selecting the hold-timer duration comprises (a) the first access network making at least one determination selected from the group consisting of (1) a determination of a network load of the first access network, (2) a determination of a data-service type of the data service, and (3) a determination of an estimated call duration for the UE and (b) the first access network using the at least one determination as a basis to select the hold-timer duration and (ii) starting the hold-timer having the selected hold-timer duration, wherein the first access network is configured to release the allocated resource upon expiration of the hold-timer duration.

5. Example Benefit of the Disclosed Method and System

The proposed method and system beneficially provides an improved way to set a hold-timer duration for releasing at least one resource allocated to a UE. As described above, an example problem associated with using a static value for the hold-timer duration is that there are disadvantages with setting the hold-timer duration too low and there are also disadvantages with setting the hold-timer duration too high. By selecting a hold-timer duration based on the network load, the data-service type, and/or the estimated call duration, the first network may beneficially select a more suitable hold-timer duration that takes into account particular circumstances of the network and/or the UE. For example, the network may set a hold-timer duration lower in a situation where the network load is higher than the network would in a situation where the network load is lower. Therefore, the network may avoid the wastage of resources in a situation where the network load is high and the network may also beneficially free up resources for other UEs operating in the network. On the other hand, when the network load is low, the network may instead reserve these resources for the UE without freeing up these resources for other UEs operating in the network, which may allow the network to continue to use these resources to serve the UE when the UE returns to the network.

As another example, the network may set a hold-timer duration higher for data-service types where a low hold-timer duration may be undesirable to a user of a UE. As yet another example, the network may also use an estimated call duration as a basis to set the hold-timer duration, thus allowing the network to set a duration that more accurately corresponds to when the UE will return to the network after engaging in a CSFB call. By taking one or more of these three determinations into account when setting a hold-timer duration, the disclosed method beneficially offers an improved way of setting a hold-timer duration in a CSFB scenario. Further, by providing this improved way to select a hold-timer duration for releasing at least one resource allocated to a UE, the disclosed method and system may in turn improve service quality for UEs operating in a wireless network. Therefore, the disclosed method and system can help to improve service quality overall for users, thus increasing user satisfaction with wireless performance.

6. Conclusion

Exemplary embodiments have been described above. Those skilled in the art will understand, however, that changes and modifications may be made to these embodiments without departing from the true scope and spirit of the invention.

We claim:

1. In a communication system comprising a first network configured to serve user equipment devices (UEs) according to a first air interface protocol and a second network configured to serve UEs according to a second air interface protocol, a method comprising:
   the first network initially serving a UE by providing the UE with data service, wherein the first network serving the UE comprises the first network allocating at least one resource to the UE and using the at least one resource to serve the UE;
   the first network detecting a circuit-switched-fallback transition of the UE from being served by the first network to being served by the second network;
   the first network setting a hold-timer duration for a hold-timer, the hold-timer duration defining a time period before the first network releases the at least one resource that the first network allocated to the UE, wherein setting the hold-timer duration comprises (i) the first network selecting (a) a first value based on a determination of a network load of the first network, (b) a second value based on a determination of a data-service type of the data service, and (c) a third value based on a determination of an estimated call duration for the UE and (ii) the first network using the sum of the first value, the second value, and the third value as a basis to set the hold-timer duration; and
   after the UE transitions from being served by the first network to being served by the second network, the first network applying the hold-timer having the set hold-timer duration.

2. The method of claim 1, wherein the first network using the sum of the first value, the second value, and the third value as a basis to set the hold-timer duration comprises: setting the sum of the first value, the second value, and the third value as the hold-timer duration.

3. The method of claim 1, further comprising maintaining correlation data that correlates network loads with respective values, wherein selecting a first value based on a determination of the network load of the first network comprises referring to the correlation data to select the first value based on the determination of the network load.

4. The method of claim 1, further comprising maintaining correlation data that correlates data-service types with respective values, wherein selecting a second value based on a determination of the data-service type of the data service comprises referring to the correlation data to select the second value based on the determination of the data-service type of the data service.

5. The method of claim 1, wherein selecting a third value based on a determination of the estimated call duration for the UE comprises setting the estimated call duration as the third value.

6. The method of claim 1, further comprising the first network making the determination of the network load of the first network, wherein the first network comprises an eNodeB and a mobility management entity (MME), and wherein making the determination of the network load of the first network comprises the MME determining the load of the eNodeB.

7. The method of claim 1, further comprising the first network making the determination of the estimated call duration based on call-duration history for the UE.

8. The method of claim 1, further comprising the first network making the determination of the estimated call duration for the UE based on call-duration history of calls on the second network.

9. The method of claim 1, wherein the first network applying the hold-timer having the set hold-timer duration comprises:
   the first network waiting the set hold-timer duration; and
   in response to expiration of the set hold-timer duration, the first network releasing the at least one resource.

10. The method of claim 1, wherein, before expiration of the hold-timer duration, the UE transitions from being served by the second network back to being served by the first network, and wherein the method further comprises the first network again using the allocated at least one resource to serve the UE.

11. The method of claim 1, wherein the at least one resource comprises a bearer for carrying communications between the UE and a transport network, and wherein releasing the at least one resource that the first network allocated to the UE comprises tearing down the bearer.

12. The method of claim 1, wherein the at least one resource comprises a UE context record stored by the first network, the UE context record specifying capability information of the UE and specifying bearer status of the UE, and wherein releasing the at least one resource that the first network allocated to the UE comprises deleting the UE context record.

13. The method of claim 1, wherein the first network is a Long Term Evolution (LTE) network, and wherein the second network is selected from the group consisting of a Code Division Multiple Access (CDMA) network and a Global System for Mobile Communications (GSM) network.

14. In a wireless communication system comprising a first access network and a second access network, a method comprising:
   the first access network serving a user equipment device (UE) by providing the UE with data service, wherein serving the UE comprises allocating a resource of the first access network to the UE and using the resource to serve the UE;

detecting a circuit-switched-fallback transition of the UE from being served by the first access network to being served by the second access network; and responsive to the detecting, (i) selecting a hold-timer duration for a hold-timer, the hold timer duration defining a time period before the first access network releases the allocated resource, wherein selecting the hold-timer duration comprises (a) the first access network selecting (1) a first value based on a determination of a network load of the first access network, (2) a second value based on a determination of a data-service type of the data service, and (3) a third value based on a determination of an estimated call duration for the UE and (b) the first access network using the sum of the first value, the second value, and the third value as a basis to select the hold-timer duration and (ii) starting the hold-timer having the selected hold-timer duration, wherein the first access network is configured to release the allocated resource upon expiration of the hold-timer duration.

15. The method of claim 14, wherein the first access network is a Long Term Evolution (LTE) access network, and wherein the second access network is a fallback network selected from the group consisting of a Code Division Multiple Access (CDMA) network and a Global System for Mobile Communications (GSM) network.

16. The method of claim 14, wherein the resource comprises a bearer for carrying communications between the UE and a transport network, and wherein releasing the allocated resource upon expiration of the hold-timer duration comprises tearing down the bearer.

17. The method of claim 14, wherein the resource comprises a UE context record stored by the first network, the UE context record specifying capability information of the UE and specifying bearer status of the UE, and wherein releasing the allocated resource upon expiration of the hold-timer duration comprises deleting the UE context record.

18. A wireless communication system comprising:

a first access network configured to provide a plurality of first coverage areas in which to serve user equipment devices (UEs) according to a first air interface protocol; and a second access network configured to provide a plurality of second coverage areas configured to serve UEs according to a second air interface protocol, wherein the first access network is configured to allocate a resource to a UE and use the resource to serve the UE by providing the UE with data service, wherein the first access network is configured to detect a circuit-switched-fallback transition of the UE from being served by the first access network to being served by the second access network, and, in response to detecting the transition, (i) select a hold-timer duration for a hold-timer, the hold-timer duration defining a time period before the first network releases the allocated resource, wherein selecting the hold-timer duration comprises (a) the first access network selecting (1) a first value based on a determination of a network load of the first access network, (2) a second value based on a determination of a data-service type of the data service, and (3) a third value based on a determination of an estimated call duration for the UE and (b) the first access network using the sum of the first value, the second value, and the third value as a basis to select the hold-timer duration and (ii) start the hold-timer having the selected hold-timer duration, wherein the first access network is further configured to release the allocated resource upon expiration of the hold-timer duration.

19. The wireless communication system of the claim 18, wherein the first access network is a Long Term Evolution (LTE) access network, wherein the second access network is a fallback network selected from the group consisting of a Code Division Multiple Access (CDMA) network and a Global System for Mobile Communications (GSM) network.

* * * * *